Dec. 15, 1942. W. F. DALZEN 2,305,145
CUTTING TOOL
Original Filed Jan. 25, 1932
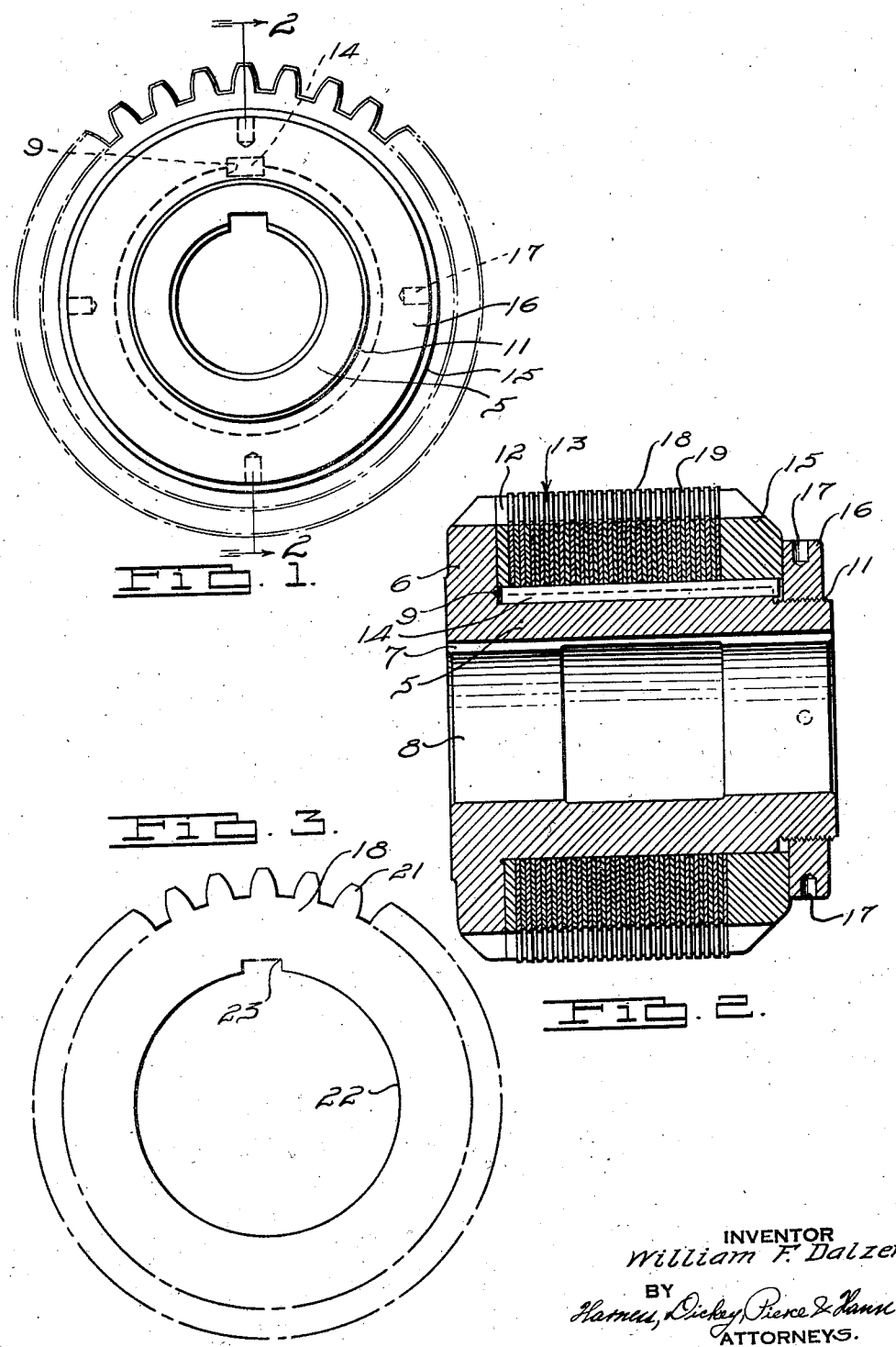
INVENTOR
William F. Dalzen
BY
Harness, Dickey, Pierce & Hann.
ATTORNEYS.

Patented Dec. 15, 1942

2,305,145

UNITED STATES PATENT OFFICE 2,305,145

CUTTING TOOL

William F. Dalzen, Detroit, Mich., assignor, by mesne assignments, to Michigan Tool Company, a corporation of Delaware Application January 25, 1932, Serial No. 588,635
Renewed October 2, 1936

8 Claims. (Cl. 29—103)

My invention relates to cutting tools and particularly to a cutting tool of the rotary type having a plurality of generating teeth, the side surfaces of which are provided with cutting edges which extend from the crown to the root thereof.

The teeth of the cutting tool may be employed for machining a gear to accurate dimensions by having the gear run in mesh with the teeth of the tool when the gear is in offset angular relation to the tool to provide a lateral arcuate movement between the sides of the teeth and those of the gears. The teeth were conventionally formed on the cutter and serrations, grooves or slots were cut in the teeth sides to provide cutting edges thereon. It is very apparent that this construction entailed considerable time and expense for machining each of the teeth to have a plurality of cutting edges extending across the sides thereof which construction is considerably simplified by utilizing the present embodiment of my invention.

My invention includes the employment of a hub which is of such diameter as to have an aperture therethrough for engagement with an arbor with which it may be keyed. A keyway is provided on the outer surface of the hub which cooperates with keyways provided on a plurality of discs of predetermined form which are mounted on the hub and retained in predetermined relation by a key which projects into the keyways. The discs are provided with teeth, one set of discs having teeth which are of a form to generate the predetermined contour on the gear to be mated therewith while the other set of discs have teeth which are of reduced dimensions, the discs being alternately disposed on the hub to have the discs with the teeth of smaller dimension act as filler plates between the generating teeth to thereby provide cutting edges without the necessity of machining each serration or groove in the teeth sides. Suitable means are provided for clamping all of the discs tightly together to form a unit construction. The tool thus provided may be then rotated in accordance with the principles set forth in my co-pending applications Serial Numbers 554,192 and 554,193, filed July 31, 1931 (the latter having issued as Patent 2,267,692 on December 23, 1941), and assigned to the assignee of the present invention.

It is to be understood that the method of constructing the tool to have the teeth provided with cutting edges apply also to racks as well as to a gear shaped tool, the plurality of elements thereof being longitudinally extended, the one set of elements having teeth of predetermined generating capacity while the elements disposed therebetween have similar teeth which are reduced to therefore make available the edges of the generating teeth for cutting purposes.

The main objects of my invention are; to provide a cutter with teeth having cutting edges on the sides thereof extending from the crown to the root and formed by assembling a plurality of elements on a retaining member; to provide a retaining member in the nature of a flanged hub, when a circular tool is constructed, the central portion of which is apertured to receive an arbor while the outer portion receives a plurality of discs which are clamped tightly together against the flange of the hub; to provide discs in the nature of cutting and spacer elements, the former having teeth of a dimension to generate predetermined teeth on a gear while the spacer discs are provided with teeth of reduced dimensions so that all points thereof will extend inwardly from the cutting edges provided about the generating teeth; to alternately assemble the discs so as to have the generating discs spaced from each other and to have the edges of the teeth thereof disposed outwardly from the teeth of the spacing discs to thereby be available to machine the sides of the teeth; and, in general, to provide a cutting tool of the above described type which is simple in construction, economical of manufacture and readily renewable.

Other objects and features of novelty of my invention will be either specifically pointed out or will become apparent when referring, for a better understanding of my invention, to the following description, in conjunction with the accompanying drawing wherein:

Figure 1 is a view in elevation of a cutting tool embodying features of my invention, Figure 2 is a sectional view of the structure illustrated in Figure 1, taken on the line 2—2 thereof, and Figure 3 is a plan view of one of the discs employed in my cutting tool.

As pointed out in my above mentioned co-pending applications, I machine the sides of teeth to extremely accurate dimensions by mating the teeth of a roughed out gear with the teeth of a cutting tool in such manner as to effect a lateral arcuate movement between the teeth of the cutting tool and those of the gear during the time the gear is rotated in mesh with the teeth of the cutter. For effecting this arcuate lateral component of movement between the teeth sides, I mate a spur gear with a spiral cutting tool and operate each in a plane through their axis.

The cutting tool may either be of a form of a rotatable gear-like tool or may be in the nature of the rack, either one of which effects the machining in the above described manner when the gear is rotated relative thereto. I prefer, however, to employ the rack as it is well known that the rack principle for generating gears producing the most accurate result because of the fact that several of the teeth are always in engagement with the rack teeth and a more accurate machining will develop.

The teeth, for effecting the cutting action of the side of the gear teeth from the crown to the root thereof, are provided with cutting edges which extend from the crown to the root to be available during the arcuate lateral movement to cut uniformly at all points of the gear teeth, at the crown, root and pitch line thereof. Such a tool distinguishes from the tools heretofore employed in the art which were rolled relative to each other without providing an arcuate movement and which thereby failed to cut at the pitch line of the teeth and the teeth were deformed rather than machined to extremely accurate dimensions.

It is very apparent that after the teeth were provided on a cutting tool of the solid type, considerable machining was necessary to form the serrations or slots to effect the closely disposed cutting edges along the sides of the teeth, which was not only difficult but was extremely expensive.

My present invention overcomes the necessity for this expensive operation by constructing the cutting tool from a plurality of unit elements which are herein illustrated as being of disc form to construct a gear type of tool. It is to be understood, however, that it is my intention to apply the same principles to the rack type of tool wherein a plurality of longitudinally extending elements are employed to form a rack in a similar manner as the discs herein illustrated and described are utilized for constituting a gear-like cutting tool.

Referring to Figures 1 and 2, it will be noted that I have provided a hub 5 having a flange 6 extending laterally thereof on one end and a keyway 7 communicating with a central aperture 8 through which an arbor of a machine, which supports the cutting tool, extends. A keyway 9 is provided on the outer surface of the hub 5, and the opposite end of the hub to that having the flange 6 thereon, is of reduced diameter and provided with a thread 11. A spacer 12 is first disposed on the hub adjacent to the flange 6 of greater thickness than the discs to be provided thereon to prevent the end disc of a stack from moving relative to a key 14 which retains the disc in aligned relation to each other and to the flange 6 of the hub. An annular pressure applying member 15 extends over the outer end of the hub 5 and the key 14 to force the discs into intimate engagement with each other when a nut 16 is screwed upon the thread 11 by a spanner wrench which engages the apertures 17 provided about the periphery of the nut. In this manner the spacer 12, the disc 13 and the member 15 are moved into intimate engagement forming a unit assembly with the hub 5 and the flange 6.

The discs 13 are of two kinds, a generating disc 18 and a filler disc 19 which are alternately disposed on the hub. The generating disc 18 is illustrated in Figure 3 as having a plurality of teeth 21 thereon of generating shape to conform to the shape of the teeth to be machined on the gear. The discs are provided with a central aperture 22 to snugly fit over the outer surface of the hub 5 and a keyway 23 is provided in the disc which mates with the keyway 9 provided in the hub. A plurality of similar discs 19 are employed for spacing the discs 18 and are not herein separately illustrated as they are similar to the discs 18 with the exception that the teeth thereof are smaller than the teeth 21 of the generating disc so as to have the periphery thereof extend inwardly of the periphery of the generating teeth 21. The discs are alternately disposed on the hub 5, as illustrated in Figure 2, to have the edge of each of the generating teeth 21 available as a cutting edge for machining the sides of the gear teeth when operated in conjunction therewith.

I preferably stamp the discs out of a desirable material and after the discs have been dressed and hardened they are assembled on the hub in the above described manner. A final machining operation is then made on the sides of the generating teeth 21 to form the sides into accurate generating shape.

It will readily be seen that my cutting tool is less expensive to manufacture than tools of the solid type, since the accurate machining required for serrating or slotting the generating teeth to provide the side cutting edges is obviated. This operation was exceedingly tedious and expensive and the cutter of necessity would have substantially the same machining required to machine the hub portion of the present tool and a considerable saving in time and money is effected when my cutting tool is employed. When the cutting tool is worn out it is only necessary to provide a new set of generating discs 18 to have a substantially new cutting tool, which obviates the scrapping of the entire tool, as has been the custom in the past, when the teeth become worn to such an extent that they can no longer be sharpened.

As pointed out hereinabove, the same principle of construction can be applied to the rack type of cutting tool wherein the longitudinally extending generating blades may be renewed from time to time without the necessity of renewing the other elements of the rack construction. The spacing and generating rack type of elements may be stamped out of material in the same manner as the discs are stamped, as above referred to, and may be pressed together in a similar manner in a suitable holding fixture.

While I have described and illustrated but a single embodiment of my invention, it will be apparent to those skilled in the art that various changes, omissions, additions and substitutions may be made therein without departing from the spirit and scope of my invention, as set forth in the accompanying claims.

I claim as my invention:

1. A tool including, in combination, a plurality of gear-like discs of similar form having the tooth faces of all of the discs falling on the face contour of the teeth of any one disc when extended, a plurality of spacing discs of smaller tooth contour alternately disposed relative to said first disc, and means for retaining said discs in intimate relation to each other.

2. A tool including, including, in combination, a plurality of gear-like discs of similar form having the tooth faces of all of the discs falling on the face contour of the teeth of any one disc when extended, a plurality of spacing discs alternately disposed relative to said first discs, and means for retaining said discs in intimate relation to each other.

3. A tool including, in combination, a plurality of gear-like discs having the tooth faces of all of the discs falling on the face contour of the teeth of any one disc when extended, a plurality of spacing discs alternately disposed relative to said first disc, and means for retaining said discs in intimate relation to each other.

4. A device for finishing gear teeth comprising a cylindrical cutter body structure adapted for rotation in meshing relation with the gear to be finished, said cutter body including a plurality of sets of circumferentially disposed cutting teeth of the same size and shape, teeth in one set being spaced axially from the teeth in an adjacent set, said teeth in profile transverse to the axis of rotation being shaped in operative conformity with the teeth of the gear to be finished, said profile in each tooth being constant over a substantial axial length thereof, and spacer means between said sets to maintain said axial spaced relation, said spacer means being smaller in diameter than the diameter of said sets of teeth and similar thereto in form.

5. A device for finishing gear teeth comprising a cylindrical cutter body structure adapted for rotation in meshing relation with the gear to be finished, said cutter body including a plurality of sets of circumferentially disposed cutting teeth of the same size and shape, teeth in one set being spaced axially from the teeth in an adjacent set, said teeth in profile transverse to the axis of rotation being shaped in operative conformity with the teeth of the gear to be finished, said profile in each tooth being constant over a substantial axial length thereof, and spacer disks between said sets to maintain said axial space relation, said spacer disks being smaller in diameter than the diameter of said sets of teeth and similar thereto in form.

6. A tool including, in combination, a plurality of gear-like discs of similar form having the tooth faces of all of the discs falling on the face contour of the teeth of any one disc when extended, a lateral edge of each disc tooth being formed as a cutting edge and said discs being disposed with said cutting edges substantially perpendicular to the pitch surface of the tool, a plurality of spacing discs alternately disposed relative to said first discs, and means for retaining said discs in intimate relation to each other.

7. A cutting tool for finishing the teeth of a roughed out gear blank of the type of gears in which meshing gears have parallel axes by relative lateral motion between the teeth of said tool and the teeth of said blank, said tool being substantially in the form of a circular gear of said type, said tool having a plurality of spaced teeth conjugate to the teeth of the gear to be finished, said teeth having their major dimension extending generally in the direction of the axes of said tool and being provided with a plurality of spaced grooves in the working faces thereof extending generally vertically of said teeth from the roots to the crests of said teeth, said grooves having side walls intersecting said faces and being of materially less depth than the thickness of said teeth, the edges of said grooves at the intersections between said faces and said side walls constituting cutting edges extending generally vertical of said teeth, the portions of said working faces of said teeth between said grooves on each of said teeth forming lands between said cutting edges, said lands on a face of each of said teeth lying in a common smooth surface and having sufficient area to form guiding surfaces for said cutting edges and provide for relative driving action between said tool and gear blank by contacting the surfaces of the teeth of said blank, the area of said lands being sufficiently small that said cutting edges are effective to cut material from said last mentioned surfaces by relative lateral motion of said cutting edges along said last mentioned surfaces without material burnishing of said last mentioned surface by said lands, said gear being built up of one set of a plurality of gear shaped discs providing said lands and said cutting edges and a second set of a plurality of spacing discs having teeth of less circumferential dimensions than the teeth of said first set of discs, the discs of said second set being positioned on a common axis with the discs of said first set and being arranged alternately with the discs of said first set to provide said grooves, and means for clamping all of said discs together.

8. A cutting tool for finishing the teeth of a roughed out gear blank of the type of gears in which meshing gears have parallel axes by relative lateral motion between the teeth of said tool and the teeth of said blank, said tool being substantially in the form of a circular gear of said type, said tool having a plurality of spaced teeth conjugate to the teeth of the gear to be finished, said teeth having their major dimension extending generally in the direction of the axes of said tool and being provided with a plurality of spaced grooves in the working faces thereof extending generally vertically of said teeth from the roots to the crests of said teeth, said grooves having side walls intersecting said faces and being of materially less depth than the thickness of said teeth, the edges of said grooves at the intersections between said faces and said side walls constituting cutting edges extending generally vertical of said teeth, the portions of said working faces of said teeth between said grooves on each of said teeth forming lands between said cutting edges, said lands on a face of each of said teeth lying in a common smooth surface and having sufficient area to form guiding surfaces for said cutting edges and provide for relative driving action between said tool and gear blank by contacting the surfaces of the teeth of said blank, the area of said lands being sufficiently small that said cutting edges are effective to cut material from said last mentioned surfaces by relative lateral motion of said cutting edges along said last mentioned surfaces without material burnishing of said last mentioned surface by said lands, said gear being built up of one set of a plurality of gear shaped discs providing said lands and said cutting edges and a second set of a plurality of spacing discs having teeth of less circumferential dimensions than the teeth of said first set of discs, an arbor for said discs, all of said discs having a central aperture receiving said arbor, the discs of said second set being arranged alternately with the discs of said first set to provide said grooves, and means for clamping said discs together on said arbor.

WILLIAM F. DALZEN.